(12) United States Patent
Valadas et al.

(10) Patent No.: US 9,293,871 B2
(45) Date of Patent: Mar. 22, 2016

(54) ELECTRICAL PLUG AND ASSOCIATED ELECTRICAL ASSEMBLY

(75) Inventors: Vincent Valadas, Ambazac (FR); Jean-Luc Chaumeny, Solignac (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 11 days.

(21) Appl. No.: 14/127,795

(22) PCT Filed: May 22, 2012

(86) PCT No.: PCT/FR2012/000205
§ 371 (c)(1),
(2), (4) Date: Dec. 19, 2013

(87) PCT Pub. No.: WO2013/001175
PCT Pub. Date: Jan. 3, 2013

(65) Prior Publication Data
US 2014/0162491 A1 Jun. 12, 2014

(30) Foreign Application Priority Data

Jun. 29, 2011 (FR) .................................... 11 02017

(51) Int. Cl.
*H01R 13/46* (2006.01)
*H01R 13/703* (2006.01)
(Continued)

(52) U.S. Cl.
CPC .......... *H01R 13/703* (2013.01); *B60L 11/1818* (2013.01); *B60L 11/1846* (2013.01);
(Continued)

(58) Field of Classification Search
CPC ...... Y02T 90/12; Y02T 90/14; H01R 13/641; H01R 13/465; H01R 29/00
USPC ................... 439/188, 488, 489, 955; 320/109
See application file for complete search history.

(56) References Cited

U.S. PATENT DOCUMENTS

| | | | | | |
|---|---|---|---|---|---|
| 4,898,079 | A | * | 2/1990 | Combette | F15B 15/2892 200/82 E |
| 5,413,493 | A | * | 5/1995 | Hoffman | B60L 11/1818 200/51.09 |

(Continued)

FOREIGN PATENT DOCUMENTS

| | | |
|---|---|---|
| DE | 10 2009 030092 A1 | 12/2010 |
| JP | S57-44743 | 3/1982 |

(Continued)

OTHER PUBLICATIONS

International Search Report, dated Aug. 9, 2012, from corresponding PCT application.

(Continued)

*Primary Examiner* — Abdullah Riyami
*Assistant Examiner* — Justin Kratt
(74) *Attorney, Agent, or Firm* — Young & Thompson (57) ABSTRACT

An electric plug (200) adapted to be plugged into a socket outlet (100) delivering an electrical signal having at least one characteristic adapted to vary in a determined range of values and including identification elements arranged to communicate or to co-operate with the electric plug to generate a pilot signal representative of the electrical signal delivered by the socket outlet, includes: reader elements (230) adapted to receive the pilot signal issued by the identification elements, and to supply the pilot signal to the electric plug; and verification elements (280) adapted to detect a spurious signal not issued by the identification elements (130), and to block forwarding of the pilot signal when such a spurious signal is detected, or to forward an alert signal to the electric plug when such a signal is detected. An electrical assembly including such an electric plug and a socket outlet are also described.

14 Claims, 5 Drawing Sheets

(51) Int. Cl.
    *H01H 36/00*     (2006.01)
    *B60L 11/18*     (2006.01)
    *H01R 29/00*     (2006.01)
    *H01R 13/641*     (2006.01)
    *H01R 13/713*     (2006.01)
    *H01R 24/30*     (2011.01)
    *H01R 105/00*     (2006.01)

(52) U.S. Cl.
    CPC ........ *H01H36/0046* (2013.01); *B60L 2230/12* (2013.01); *B60L 2230/16* (2013.01); *B60L 2250/10* (2013.01); *H01R 13/465* (2013.01); *H01R 13/641* (2013.01); *H01R 13/713* (2013.01); *H01R 24/30* (2013.01); *H01R 29/00* (2013.01); *H01R 2105/00* (2013.01); *H01R 2201/26* (2013.01); *Y02T 10/7005* (2013.01); *Y02T 10/7088* (2013.01); *Y02T 90/12* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | |
|---|---|---|
| 7,421,249 B2 | 9/2008 | Ariyoshi et al. |
| 8,618,767 B2 | 12/2013 | Ishii et al. |
| 2005/0052796 A1* | 3/2005 | Camwell et al. ................... 361/1 |
| 2008/0079391 A1* | 4/2008 | Schroeck ............ H01M 2/1022 320/106 |
| 2012/0135634 A1 | 5/2012 | Gaul et al. |

FOREIGN PATENT DOCUMENTS

| | | |
|---|---|---|
| JP | H03-149776 | 6/1991 |
| JP | H09-181657 | 7/1997 |
| JP | 2005-244944 | 9/2005 |
| JP | 2009-71989 | 4/2009 |

OTHER PUBLICATIONS

JP Office Action, dated Dec. 1, 2015; Application No. 2014-517866.

* cited by examiner

ELECTRICAL PLUG AND ASSOCIATED ELECTRICAL ASSEMBLY

TECHNICAL FIELD TO WHICH THE INVENTION RELATES

The present invention generally relates to the field of electric plugs.

It relates more particularly to an electric plug that is adapted to be plugged into a socket outlet delivering an electrical signal that depends on the intrinsic characteristics of the socket outlet and including identification means that are adapted to communicate or to co-operate with the electric plug so as to generate a pilot signal that is representative of said electrical signal delivered by the socket outlet.

It also relates to the field of electrical assemblies each comprising a socket outlet and an electric plug.

TECHNOLOGICAL BACKGROUND

Charging the battery of a motor vehicle requires a current that is typically equal to 14 amps (A) to pass through the battery for several hours.

For practical reasons, it is thus advantageous for the user to plug the battery of the motor vehicle into a standard domestic socket outlet that is standardized for 16 A.

Theoretically, that type of socket outlet presents intrinsic characteristics that enable it to deliver a current that is less than or equal to 16 A for a standardized duration.

However, that type of socket outlet satisfies standard requirements that are defined for ordinary domestic uses for which the current delivered is usually less than 14 A or 16 A, with the socket outlet being used at frequencies and for durations that are less than the frequencies and the durations that are necessary for charging the battery of a motor vehicle.

Furthermore, in practice, the intrinsic characteristics of the socket outlets installed in the homes of users may vary from one socket outlet to another, and may also vary over time. It is impossible to know such characteristics with certainty.

It is also possible that the user is confronted with a socket outlet that does not comply with the standard.

Such uncertainty concerning the intrinsic characteristics of socket outlets, and thus concerning suitability for delivering a current of 14 A or more for several hours, and in regular manner, is not acceptable since it jeopardizes the safety of people and of installations.

A novel domestic application such as charging an electric vehicle may stress socket outlets to the limits of standard characteristics, and consequently requires accurate knowledge of the type and of the quality of the socket outlet used in order to take advantage of the maximum capacities of the socket outlet without damaging it.

Unfortunately, presently known electric plugs that are connected to electrical equipment are not arranged to recognize the characteristics of a socket outlet into which they are plugged.

An electrical appliance connected to a standard electric plug draws a current that is determined by its own characteristics, without it being possible for the appliance to adapt its operation to the socket outlet into which it is plugged.

By way of example, document DE102009030092 discloses an electrical assembly comprising a socket outlet and an electric plug that is adapted to be inserted into the socket outlet. The electric plug includes connection recognition means that are adapted to receive a connection signal issued by the socket outlet, and communication means that are adapted to receive identification data from the socket outlet and to issue a validation signal if the data is satisfactory.

However, a drawback of that assembly is that it does not have any means for detecting a spurious signal that does not originate from one of its elements, i.e. from the plug or from the socket outlet.

OBJECT OF THE INVENTION

In order to remedy the above-mentioned drawback of the prior art, the present invention proposes a novel type of electric plug that is adapted to communicate with the socket outlet for the electrical appliance to which it is connected, and that is adapted to guarantee that the pilot signal received does indeed originate from the socket outlet.

More particularly, the invention proposes an electric plug as defined above, said electric plug including:
  reader means that are adapted to receive the pilot signal issued by said identification means, and to supply said pilot signal to the electric plug; and
  verification means that are adapted to detect a spurious signal not issued by the identification means, and to block forwarding of the pilot signal when such a spurious signal is detected.

Thus, the electric plug does not forward the pilot signal to the appliance to which it is connected, and said appliance adjusts its operation as if the socket outlet were a standard socket outlet without any identification means.

The invention also provides an electric plug as defined in the introduction, said electric plug including:
  reader means that are adapted to receive the pilot signal issued by said identification means, and to supply said pilot signal to the electric plug; and
  verification means that are adapted to detect a spurious signal not issued by the identification means, and to forward an alert signal when such a spurious signal is detected.

The electric plug thus forwards an alert signal indicating that the pilot signal issued by it is perhaps erroneous. The appliance that is plugged into said socket outlet may thus adjust its operation without taking account of the pilot signal.

The socket outlet of the invention has other characteristics that are non-limiting and advantageous, as follows:
  said reader means comprise a reed switch that is sensitive to magnetic fields;
  said verification means comprise a reed switch that is sensitive to magnetic fields;
  said reader means comprise a reed switch in which the contacts are triggered to move together by the presence of a magnetic field, and said verification means comprise a reed switch in which the contacts are triggered to move apart by the presence of a magnetic field;
  the reader means comprise a first reed switch and the verification means comprise a second reed switch, said first reed switch being situated closer to the front face of the plug carrying the connection pins of the plug than the second reed switch;
  the two reed switches are connected in series in a common secondary electrical circuit of the electric plug;
  the reed switch of the reader means is connected to a secondary electrical circuit of the electric plug and the reed switch of the verification means is connected to a tertiary electrical circuit of the plug, distinct from the secondary electrical circuit;
  the reader means and the verification means are carried by a single support;
  said reader means comprise a Hall-effect sensor; and
  said verification means comprise a Hall-effect sensor.

The invention also provides an electrical assembly comprising a socket outlet and an electric plug that is adapted to be plugged into said socket outlet, the socket outlet delivering an electrical signal that depends on the intrinsic characteristics of the socket outlet and including identification means that are adapted to communicate or to co-operate with reader means of the electric plug so as to generate a pilot signal that is representative of the electrical signal delivered by the socket outlet, and the electric plug further comprising verification means that are adapted to detect a spurious signal not issued by the identification means, and to block forwarding of the pilot signal when such a spurious signal is detected.

The electrical assembly of the invention has other characteristics that are non-limiting and advantageous, as follows:

said identification means of the socket outlet comprise a magnet, said reader means of the electric plug comprise a secondary electrical circuit comprising a first reed switch that is sensitive to magnetic fields and that is adapted to change state when the electric plug is inserted into the socket outlet, and said verification means comprise a second reed switch that is connected in series with said first reed switch and that is adapted to change state when the electric plug is approached by a spurious magnetic field not issued by the socket outlet; and said identification means of the socket outlet comprise a magnet, said reader means of the electric plug comprise a Hall-effect sensor that is adapted to issue said electrical pilot signal by means of a secondary electrical circuit of the electric plug when the electric plug is inserted into said socket outlet, and said verification means comprise a reed switch that is arranged on the secondary circuit, in series with said Hall-effect sensor, and that is adapted to change state when the electric plug is approached by a spurious magnetic field not issued by the socket outlet.

The invention finally provides an electrical assembly comprising a socket outlet and an electric plug that is adapted to be plugged into said socket outlet, the socket outlet delivering an electrical signal that depends on the intrinsic characteristics of the socket outlet and including identification means that are adapted to communicate or to co-operate with reader means of the electric plug so as to generate a pilot signal that is representative of the electrical signal delivered by the socket outlet, and the electric plug further comprising verification means that are adapted to detect a spurious signal not issued by the identification means, and to forward an alert signal when such a spurious signal is detected.

The electrical assembly of the invention has other characteristics that are non-limiting and advantageous, as follows:

said identification means of the socket outlet comprise a magnet, said reader means of the electric plug comprise a secondary electrical circuit comprising a first reed switch that is sensitive to magnetic fields and that is adapted to change state when the electric plug is inserted into the socket outlet, and said verification means comprise a tertiary electrical circuit comprising a second reed switch that is adapted to change state when the electric plug is approached by a spurious magnetic field not issued by the socket outlet;

said identification means of the socket outlet comprise a magnet, said reader means of the electric plug comprise a first Hall-effect sensor that is adapted to issue said electrical pilot signal by means of a secondary electrical circuit of the electric plug when the electric plug is inserted into said socket outlet, and said verification means comprise a second Hall-effect sensor that is adapted to issue said electrical alert signal by means of a tertiary electrical circuit of the electric plug when the electric plug is approached by a spurious magnetic field not issued by the socket outlet.

DETAILED DESCRIPTION OF AN EMBODIMENT

The following description of non-limiting examples given with reference to the accompanying drawings, makes it possible to understand what the invention consists of and how it can be reduced to practice.

In the accompanying drawings.

Firstly, it should be observed that, from one figure to another, identical or similar elements of the various embodiments of the invention are, as far as possible, referenced using the same references, and they are not described each time.

Figure 1:
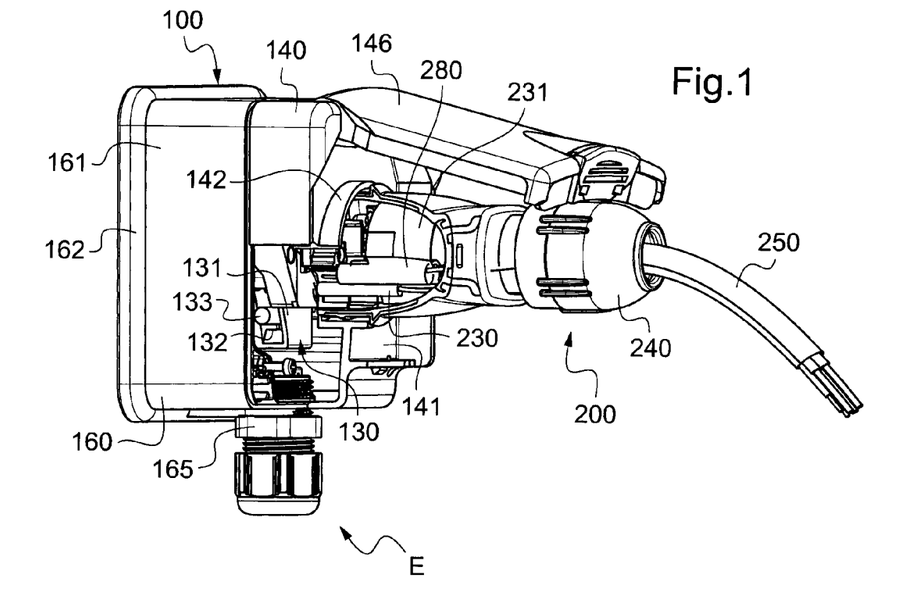
FIG. 1 is diagrammatic perspective view of a socket outlet and of an electric plug of the invention, with the body of the socket outlet and of the annular support of the reader and verification means of the plug cut away in part.
Figure 11:
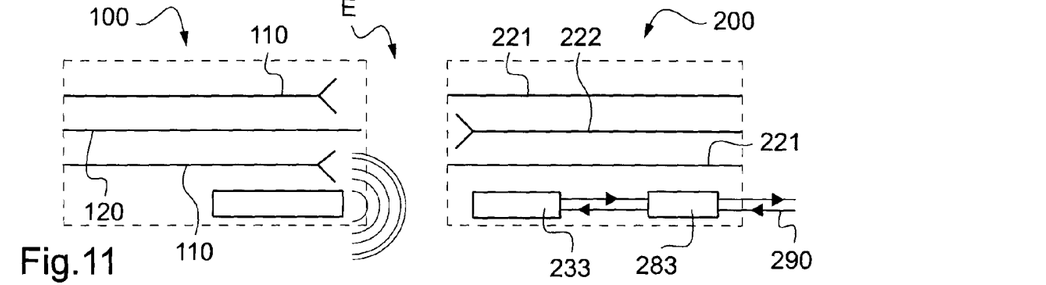
FIG. 11 is a diagrammatic representation of the FIG. 1 electric plug and socket outlet.
Figure 14:
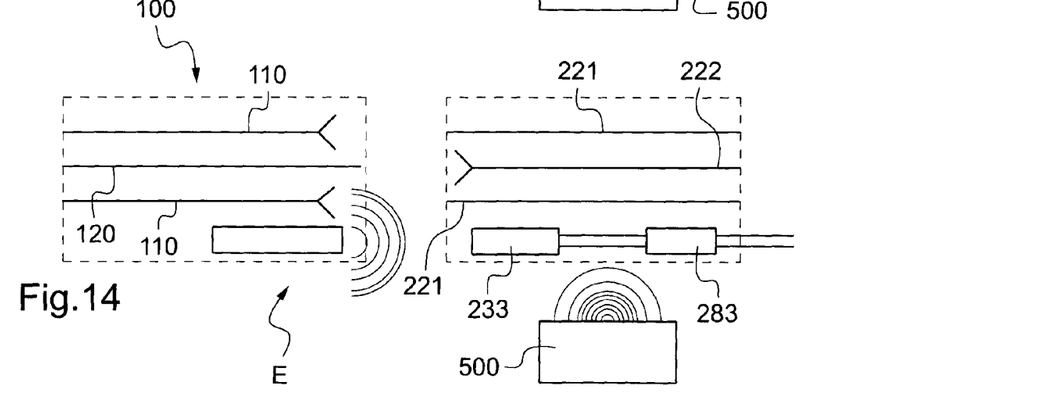
FIG. 14 is a diagrammatic representation of the FIG. 1 electric plug and socket outlet, in the presence of a spurious magnetic field.

FIGS. 1, 11, and 14 show an electrical assembly E of the invention;

The electrical assembly E comprises an electric plug 200 of the invention, and a socket outlet 100 that is adapted to co-operate with the electric plug, as explained in greater detail below.

More particularly, FIGS. 1 and 5 to 14 show a possible embodiment of the electric plug 200 of the invention.

FIGS. 1 to 4 and 11, 14 show two embodiments of the socket outlet 100 that is adapted to co-operate with the electric plug 200 of the invention.

The socket outlet 100 is adapted to deliver an electrical signal continuously.

The electrical signal presents predetermined characteristics that depend on the physical intrinsic characteristics of the socket outlet and on the power supply to the socket outlet.

The electrical signal delivered by the socket outlet may be characterized by the delivered current in amps, by its voltage measured across the terminals of the socket outlet, or by the frequency in hertz of the alternating electrical signal, or by the power of the electrical signal. In particular, the characteristic may be any physical magnitude associated with the electrical signal delivered by the socket outlet.

The term "intrinsic characteristics of the socket outlet" means, in particular, the physical characteristics that determine how hot the socket outlet becomes and what temperature it can withstand while it is operating.

For example, the intrinsic characteristics of the socket outlet are its internal resistance, its shape, and the insulating and conductive materials that are used to manufacture it.

The maximum current that the socket outlet is adapted to deliver depends, in particular, on the intrinsic characteristics of the socket outlet.

The term "maximum current" means the maximum current of the electrical signal that the socket outlet can deliver for a determined time without being damaged.

The socket outlet 100 includes identification means 130 that are adapted to communicate with the electric plug 200 so as to supply a pilot signal that is determined as a function of the electrical signal.

The pilot signal may thus depend on the intrinsic characteristics of the socket outlet, on the current that is delivered, on the voltage measured across the terminals of the socket outlet, on the frequency of the alternating electrical signal, or on the power of the electrical signal.

In particular, it may be determined as a function of the maximum current that the socket outlet is adapted to deliver given the intrinsic characteristics of the socket outlet.

Thus, the socket outlet 100 is adapted to communicate with the electric plug 200 that is plugged therein, so as to supply a pilot signal to said plug, which signal informs said plug, by way of example, about the maximum current that can be delivered by said socket outlet 100, without the socket outlet being damaged.

In remarkable manner, the electric plug 200 of the invention is adapted to communicate with the socket outlet so as to receive or to generate, in secure manner, the pilot signal, and to forward it to the electrical appliance that is connected to the electric plug.

The electrical appliance may thus be programmed so as to adapt its operation as a function of the pilot signal issued by the socket outlet.

To this end, the electric plug 200 of the invention is adapted to be plugged into the socket outlet 100 and includes:
  reader means 230 that are adapted to receive the pilot signal issued by said identification means 130, and to supply said pilot signal to the electric plug 200; and
  verification means 280 that are adapted to detect a spurious signal not issued by the identification means.

In the preferred embodiment of the invention shown in the figures, the verification means 280 of the electric plug are adapted to block forwarding of the pilot signal when such a spurious signal is detected.

This avoids forwarding a pilot signal that is associated with the presence of a spurious signal and not with the identification means of the socket outlet.

The user is thus certain that the electrical appliance connected to the electric plug will only modify its operation as a function of a pilot signal supplied by the socket outlet itself, and not because of a spurious signal.

In a variant that is not shown, the verification means of the electric plug are adapted to forward an alert signal when such a spurious signal is detected.

The pilot signal and the alert signal may thus be forwarded to the electrical appliance connected to the electric plug. The electrical appliance is programmed so as to adapt its operation accordingly.

By way of example, the electrical appliance connected to the electric plug 200 of the invention may be an electric motor vehicle.

The socket outlet 100 that is adapted to co-operate with the electric plug of the invention more particularly presents intrinsic characteristics that are adapted to passing a current of 16 A on a continuous basis.

In particular, the socket outlet is a socket outlet that is dedicated to charging a battery of the electric vehicle. In particular, the socket outlet is adapted to deliver a charging current that is equal to 14 A.

In this embodiment, the pilot signal thus informs the electric plug 200 that is plugged into the socket outlet 100 that the socket outlet 100 does indeed present the intrinsic characteristics necessary for charging the battery of the motor vehicle with a charging current of 14 A.

In other words, the socket outlet 100 of the invention communicates with the electric plug 200 by issuing a pilot signal to the electric plug, which signal indicates the maximum value of the current that the socket outlet can deliver without being damaged. The electric plug can then forward the pilot signal to the electric motor vehicle.

The electric vehicle can then adjust the value of the current that the battery of the vehicle draws from the socket outlet for charging purposes, in order to avoid exceeding the maximum-current value.

In practice, in this embodiment, the identification means of the socket outlet 100 shown in FIGS. 1 to 4, 11, and 14 comprise a magnet 133.

The magnet 133 produces a magnetic field that constitutes the pilot signal of the socket outlet 100.

Figure 3:
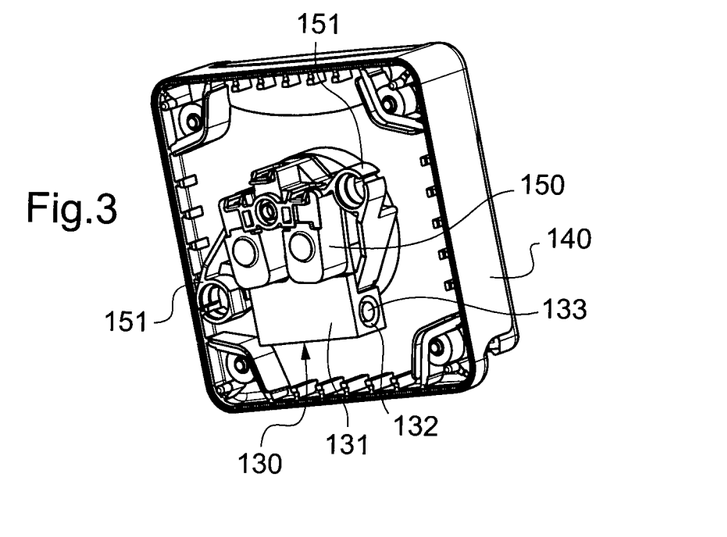
FIG. 3 is a diagrammatic rear view in perspective of the FIG. 2 socket outlet without its casing.

The socket outlet 100 includes an equipment mechanism 150 and a trim cover 140 that is fitted on the front face of the equipment mechanism 150 (FIG. 3).

Figure 2:
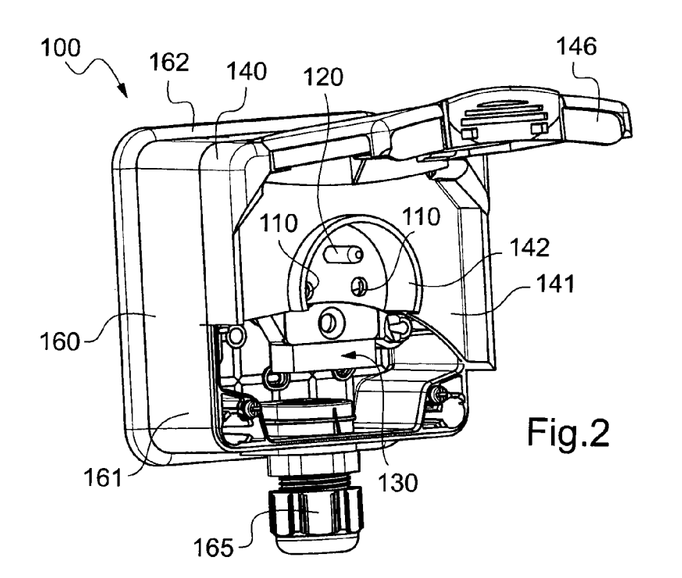
FIG. 2 is a diagrammatic front view in perspective of a first embodiment of the FIG. 1 socket outlet.

The rear face of the socket outlet 100 is closed by a casing 160 shown in FIGS. 1 and 2.

In this embodiment, the socket outlet 100 is for surface mounting on a reception wall. In a variant, it is also possible to envisage that the socket outlet is flush mounted in the reception wall.

In the embodiment shown, the equipment mechanism 150 includes a base made of insulating material that is mounted in the casing by means of tabs 151, forming respective reception wells that are adapted to receive respective complementary mounting lugs that are provided in the casing (FIG. 3).

Trim 142 that forms the reception wells of the socket outlet 100 is fitted on the front of the base of the equipment mechanism and emerges from a front face 141 of the trim cover 140 (FIG. 2).

The trim cover 140 further includes a flap 146 that is pivotally mounted on the front face of the trim cover 140, so as to close the access to the reception wells of the socket outlet 100 (FIGS. 1 and 2).

The casing 160 includes a rear wall that is surrounded by four side walls 161 that extend perpendicularly to the rear wall (FIGS. 1 and 2). Its front face is closed by the trim cover 140.

The rear wall is surrounded by a flexible rim 162 that acts as a sealing gasket between the socket outlet 100 and the reception wall from which it projects.

One of the side faces 161 of the casing 160 includes a circular opening into which a compression gland 165 is inserted (FIGS. 1 and 2), via which the electric power wires (not shown) of the socket outlet 100 penetrate into the casing 160.

In conventional manner, the base of the equipment mechanism 150 supports three terminals 110, 120 (FIGS. 2 and 11, 14) that are adapted to be connected electrically to said line, neutral, and earth wires of the socket outlet 100.

A pin connected to the earth terminal 120 projects into the reception well of the socket outlet.

When the electrical terminals 110, 120 are connected, the socket outlet 100 delivers said electrical signal continuously.

The identification means 130 comprise the magnet 133 and a support 131 that includes a housing 132 that receives the magnet 133 (FIGS. 1 to 3).

In the socket outlet 100 shown in FIGS. 1 to 3, the support 131 is constituted by an L-shaped part having one branch that forms said housing 132 and its other branch that includes mounting means for mounting on the base of the equipment mechanism 150, e.g. by screw-fastening or by crimping.

In a variant, the support may be mounted on the casing or the trim cover of the socket outlet. However, it is advantageous to secure the identification means of the socket outlet to the base of the equipment mechanism, so as to form an element that can be inserted into various socket outlet casings.

It is thus possible to change the casing or the trim cover of the socket outlet without it being necessary to remove the identification means and then put them back into place.

Advantageously, the housing 132 is in the form of a cylindrical cavity, and the magnet 133 is in the form of a bar that is slid into the housing 132.

By way of example, the magnet 133 presents a length of 25.4 millimeters (mm), a diameter of 6.35 mm, and an adherence force of 1.6 kilograms (kg).

The magnet may be a permanent magnet having magnetization that is characterized by reference N42, which means that the energy density of the magnet 133 is 42 Mega Gauss Oersted (MGOe), and that it may be used up to an ambient temperature of 80 degrees Celsius (° C.).

Its coating is made of nickel, for example.

The magnet 133 is arranged in the proximity of a wall of the reception well of the socket outlet 100, so as to be close to the electric plug 200 when it is inserted into the reception well.

In this embodiment, the L-shape of the support 131 enables the magnet 133 to be held as close as possible to the rear wall of the reception well of the socket outlet 100.

In this embodiment, the magnet 133 extends parallel to the rear wall of the reception well of the socket outlet 100.

Figure 4:
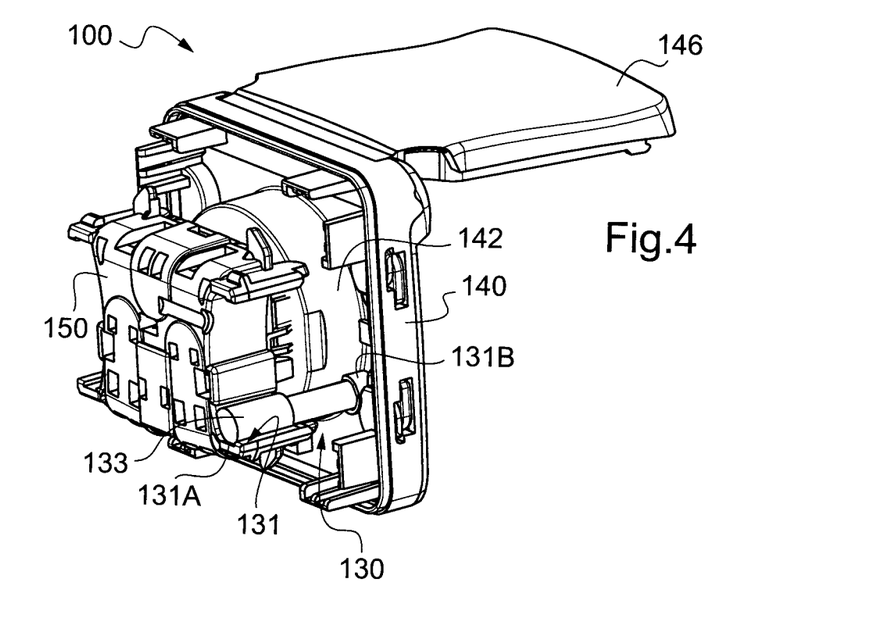
FIG. 4 is a diagrammatic rear view in perspective of a second embodiment of the FIG. 1 socket outlet without its casing.

FIG. 4 shows a variant of the first embodiment in which only the support and the position of the magnet 133 are different.

In the variant shown in FIG. 4, the support 131 of the magnet 133 comprises a cradle 131A that is formed in the base of the equipment mechanism 150, and a sleeve 131B that projects from the rear face of the trim cover 140.

The cradle 131A and the sleeve 131B each receive one end of the magnet 133 that extends along the axis of the reception well of the socket outlet 100, perpendicularly to the rear wall of the reception well.

In this embodiment, the magnet 133 is close to the side wall of the reception well of the socket outlet 100.

FIGS. 5 to 10 show, more particularly, the electric plug 200 of the invention, or portions of the electric plug.

In conventional manner, the electric plug 200 includes an insulating body 210 that houses two metal electrical-connection pins 221 that emerge from a front portion 220 of the body along directions that are parallel to the longitudinal axis of said body 210.

The body 210 is made out of insulating material, e.g. by molding plastics material.

Figure 5:
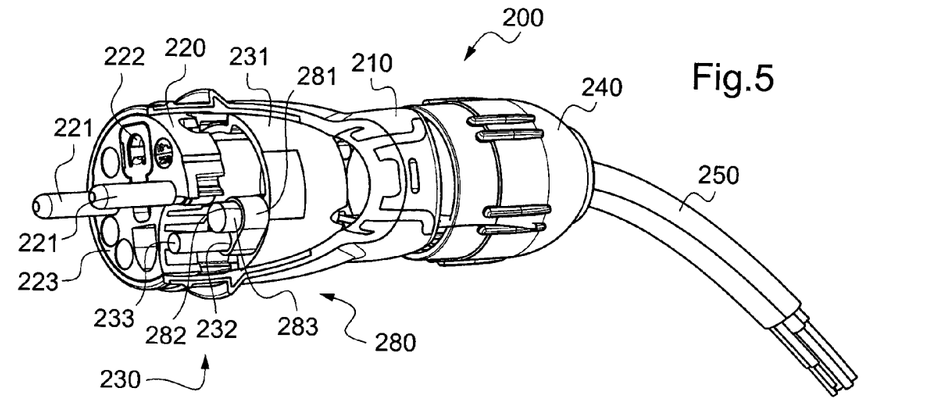
FIG. 5 is a diagrammatic front view in perspective of an electric plug of the invention.
Figure 6:
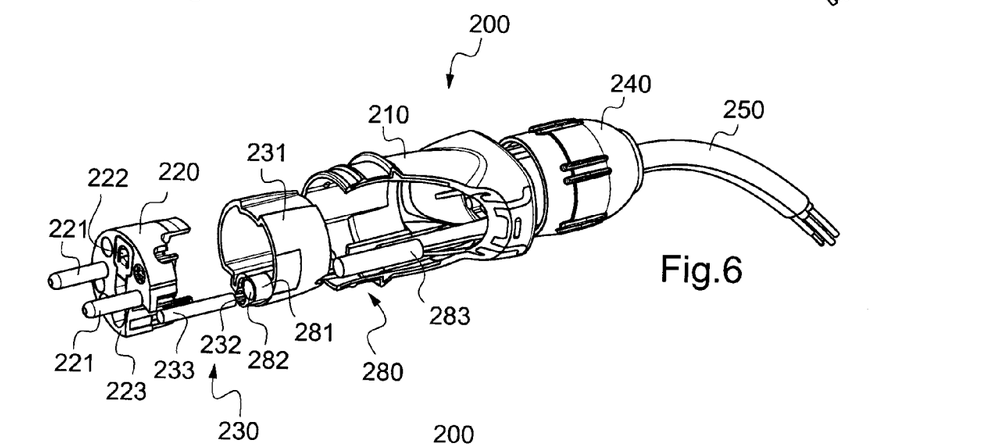
FIG. 6 is an exploded diagrammatic view of FIG. 5 socket outlet.

Said front portion 220 is in the form of a body that is circularly cylindrical around the longitudinal axis of said body and that is closed at the front by a front wall 223 through which said pins 221 project (FIGS. 5 and 6).

Said front portion 220 also includes a housing that opens out into the front wall 223 via an opening. The housing houses a terminal 222 that is adapted to receive the pin 120 of the socket outlet 100 that is inserted through said opening so as to connect the electric plug 200 to earth.

The body 210 of the electric plug 200 is extended at the rear by a rear element 240 through which there passes the electric wires 250 that connect the electric plug 200 to an electrical appliance (not shown), e.g. to the electric motor vehicle.

The reader means 230 of the electric plug 200 comprise: an annular support 231 (FIGS. 4 to 7 and 9, 10) through which said electric wires of the electric plug 200 pass; and a first reed switch 233 that is mounted on the annular support 231. The reader means also comprise a secondary electrical circuit 290 (FIGS. 11 to 14) that is connected to the reed switch 233.

In this embodiment, the term "secondary electrical circuit 290" means an electrical circuit of the electric plug that is distinct from the main electrical circuit that connects the pins of the electric plug to the corresponding electrical appliance.

The secondary electrical circuit 290 may be an electrical circuit that is connected to the inlet and the outlet of the reed switch 233 and to the electrical appliance, i.e. in this embodiment to the motor vehicle, or to a voltage or current detector of any type that is capable of detecting current passing through said secondary circuit.

The secondary circuit may also be connected firstly between one end of the reed switch 233 and the electrical appliance, and secondly between the other end of the reed switch and the earth terminal 222 of the electric plug.

The annular support 231 replaces the cable clamp that is usually housed in the body 210, at the rear of the front portion 220.

The verification means 280 of the electric plug 200 comprise a second reed switch 283.

In this embodiment, the second reed switch 283 is housed in the annular support 231 of the reader means 230, and is connected to the same secondary electrical circuit as the first reed switch 233.

More precisely, the first and the second reed switches 233, 283 are connected in series in the secondary circuit.

The first reed switch 233 of the reader means 230 of the electric plug 200 has two contacts that are spaced apart in the absence of a magnetic field, and that come into contact with each other in the presence of a magnetic field acting in any direction.

The second reed switch 283 of the verification means 280 of the electric plug 200 comprises two contacts that are in contact in the absence of a magnetic field, and that move apart in the presence of a magnetic field acting in any direction.

In each reed switch 233, 283, the two contacts are arranged in a glass tube that is filled with an inert gas that protects them against oxidation.

The interrupting capacity of each reed switch 233, 283 corresponds to the maximum current that can be passed through it without damaging the contacts, and it lies in the range 1 milliamp (mA) to 4 A. The trigger time of each reed switch 233, 283, corresponding to the time taken by the contacts in order to come into contact with each other or to move apart in the presence of a magnetic field, is about 0.5 milliseconds (ms).

The sensitivity and the position occupied in the electric plug 200 by the first reed switch 233 are determined such that closure of the first reed switch is triggered by the magnetic field of the magnet 133 of the socket outlet while the electric plug 200 is being inserted into the socket outlet 100.

The sensitivity threshold of the first reed switch is about 2.3 millitesla (mT). The first reed switch is positioned in the body of the electric plug 200 in such a manner as to be situated close to the front face of the electric plug, and thus as close as possible to the socket outlet when the electric plug is inserted into said socket outlet.

The sensitivity and the position occupied in the electric plug 200 by the second reed switch 283 are determined such that closure of the second reed switch 283 is triggered by a spurious magnetic field that is close to the electric plug 200, but that is different from the magnetic field of the magnet 133 of the socket outlet. The second reed switch 283 is arranged such that it does not change state when the electric plug 200 is inserted into the socket outlet 100 and when there is no spurious magnetic field, distinct from the magnetic field issued by the magnet 133 of the socket outlet 100, in proximity therewith.

The sensitivity threshold of the second reed switch 283 is about 1.7 mT.

The sensitivity threshold, i.e. the trigger threshold of the second reed switch is preferably lower than the sensitivity threshold of the first reed switch such that, in the presence of a spurious magnetic field, the second reed switch opens before the first reed switch closes.

Thus, no pilot signal is forwarded as a result of the spurious magnetic field, even for a brief period of time.

The second reed switch is positioned in the body of the electric plug 200 in such a manner as to be set back from the first reed switch 233 relative to the front face of the electric plug 200. In other words, the second switch 283 is situated further away from the front face of the electric plug 200 than is the first reed switch 233.

More precisely, the second reed switch 283 is offset by a length L (FIG. 7) equal to 10 mm along the longitudinal axis of the electric plug 200 relative to the first reed switch 233.

In the embodiment shown, the magnetic field issued by the magnet 133 of the socket outlet 100 lies in the range 11 mT to 15 mT at the first reed switch 233, and lies in the range 0.1 mT to 1.4 mT at the second reed switch 283. The sensitivity threshold of the second reed switch 283 is thus too high for the presence of the magnetic field of the magnet of the socket outlet to trigger a change in the state of the second switch.

In contrast, the opening of the second reed switch 283 is triggered if a spurious magnetic field source is moved towards the electric plug 200, e.g. sideways.

The first reed switch 233 is housed, in part, in a housing that is in the form of a cylindrical orifice 232 that is formed longitudinally, in the thickness of the annular support 231 (FIGS. 5, 6, and 8 to 10).

Figure 7:
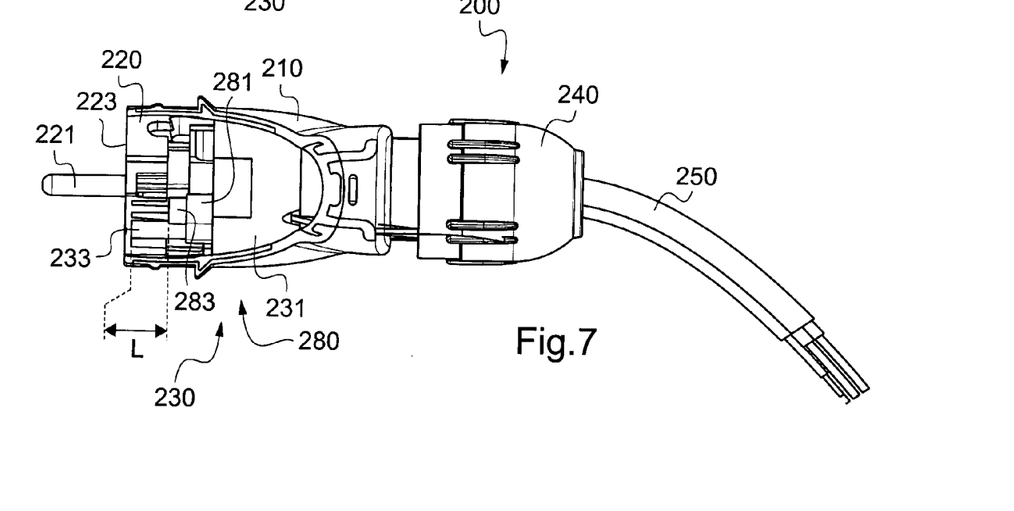
FIG. 7 is a diagrammatic side view of the FIG. 5 electric plug.
Figure 8:
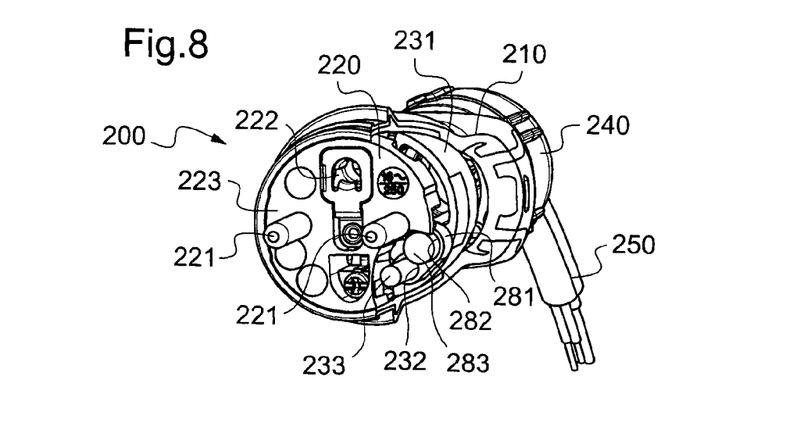
FIG. 8 is a diagrammatic view in perspective of the front end of the FIG. 5 electric plug.
Figure 9:
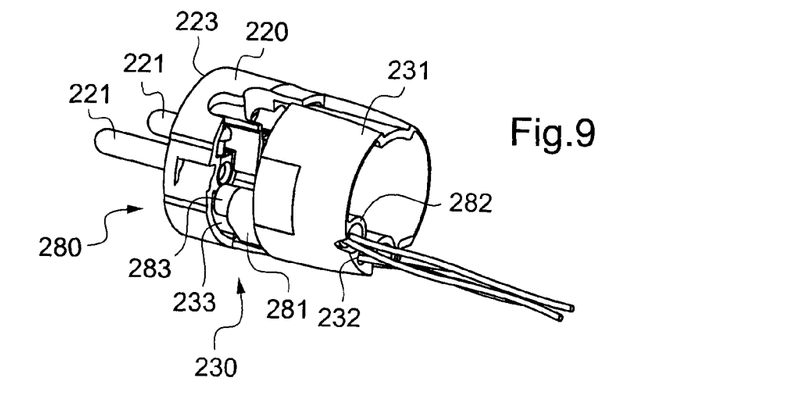
FIG. 9 is a diagrammatic view of an inner portion of the FIG. 5 electric plug.
Figure 10:
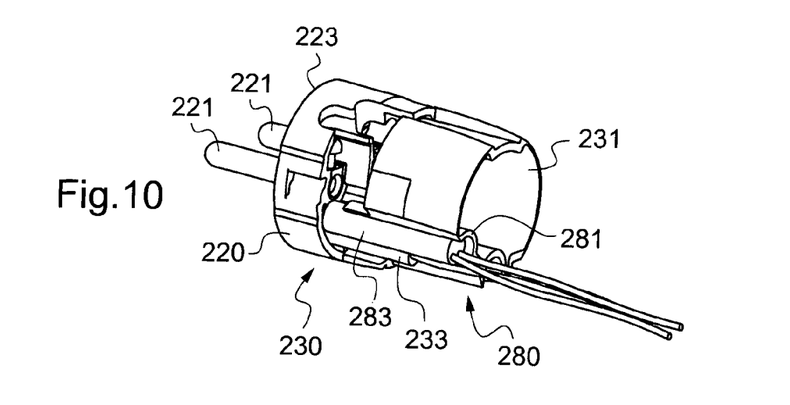
FIG. 10 is a diagrammatic view of the inner portion of the FIG. 9 electric plug, with the annular support cut away in part.

A portion of the first reed switch 233 projects from the annular support 231, towards the front of the electric plug 200 (FIGS. 5, 7, and 8).

The free end of the first reed switch 233 is thus situated very close to the front wall of the front portion 220 of the electric plug 200.

The second reed switch 283 is also housed, in part, in a housing that is in the form of a cylindrical orifice 282 that is formed in the annular support 231.

A portion of the second reed switch 283 projects from the annular support 231 and from the sleeve 281, towards the front of the electric plug 200 (FIGS. 5, 7, and 8).

The free end of the second reed switch 283 is situated set back from the front end of the first reed switch by 10 mm.

In a variant and by way of example, it is possible to envisage that the free end of the second reed switch 283 is situated set back from the front end of the first reed switch by a distance lying in the range 8 mm to 12 mm.

The two cylindrical orifices 232, 282 receiving the reed switches are formed, in part, in a sleeve 281 that projects at the front of the annular support 231.

The two reed switches are housed in the same annular support 231. In a variant, it is possible to envisage two different supports for the two reed switches.

For example, the first reed switch may be arranged in some other way in the electric plug, but still in the proximity of the front face of the front portion of the electric plug.

By way of example, the first reed switch may be housed in an oblong sheath that is slid and held in a slot that is formed in the front portion of the electric plug, parallel to the longitudinal axis of the electric plug. The slot is formed in a peripheral portion of the front portion.

In this configuration, the support of the first reed switch is constituted by the front portion of the electric plug. The second reed switch may be housed in an annular support that is similar to the above-described annular support.

When the electric plug 200 is inserted into the socket outlet 100, the front face of the front portion 220 of the electric plug 200 bears against the rear wall of the reception well of the socket outlet 100, and thus the first reed switch 233 is positioned in the proximity of the magnet 133 of the identification means 130 of the socket outlet 100.

The reed switch 233 is thus immersed in the magnetic field produced by the magnet 133 of the socket outlet 100 and passes from its open position, in which its contacts are spaced apart, to a closed position in which its contacts are in contact, thereby allowing an electric current to flow through the secondary electrical circuit of the electric plug 200.

Since the magnetic field of the magnet 133 of the socket outlet rapidly decreases on moving away from the magnet, the second switch 283 is not opened by inserting the electric plug 200 into the socket outlet 100.

As shown in FIG. 11, in this configuration in which no spurious magnetic field is present and in which the electric plug 200 is brought up to the socket outlet 100 including the magnet 133, a current flows through the secondary circuit 290, since the first and second reed switches are closed.

The passage of current makes it possible to forward said pilot signal to the electrical appliance connected to the plug.

Advantageously, the electric plug 200 is entirely suitable for being used with a standard socket outlet 10 that does not include any identification means, or that includes identification means that are not compatible with the reader means of the plug.

Figure 12:
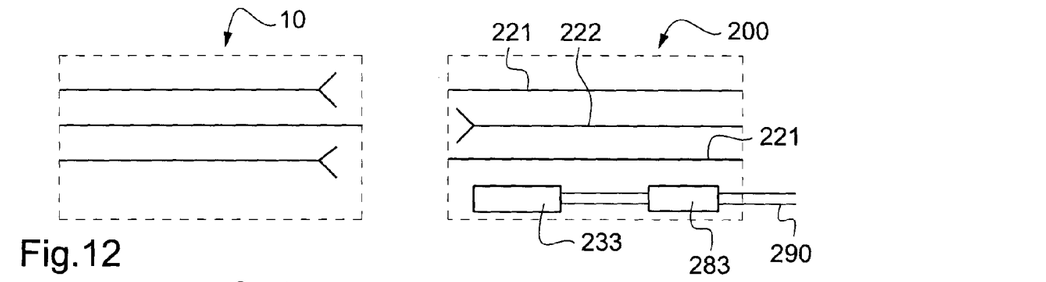
FIG. 12 is a diagrammatic representation of the FIG. 1 electric plug and of a conventional socket outlet.

As shown in FIG. 12, if the electric plug 200 is brought up to a standard socket outlet 10 that does not include identification means, and if no spurious magnetic field is present, the second reed switch 283 is closed, but no current flows through the secondary circuit 290, since the first reed switch 233 is open.

Figure 13:
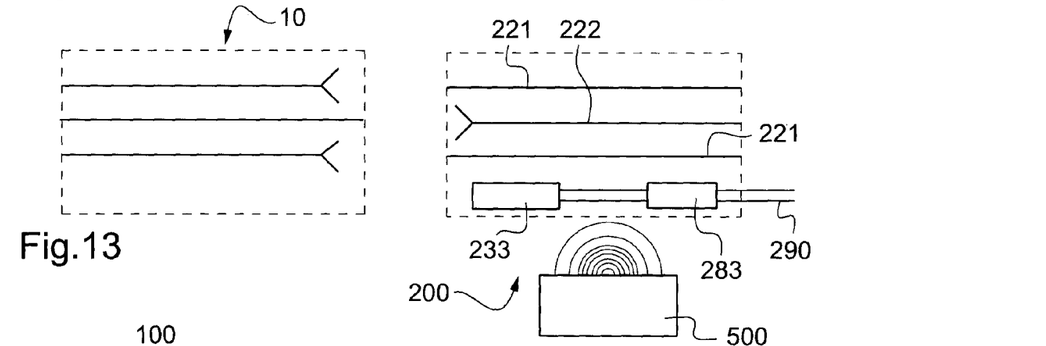
FIG. 13 is a diagrammatic representation of the FIG. 1 electric plug and of a conventional socket outlet, in the presence of a spurious magnetic field.

As shown in FIG. 13, if the electric plug 200 is brought up to a conventional socket outlet 10 that does not include identification means, but a device 500 that generates a spurious magnetic field is present in the proximity of the electric plug 200, no electric current flows through the secondary electrical circuit 290, since the second reed switch 283 is opened under the effect of the spurious magnetic field.

This remains true whether or not the first reed switch 233 is closed under the action of the spurious magnetic field.

Finally, as shown in FIG. 14, if the electric plug 200 is brought up to a socket outlet 100 that includes magnetic identification means, and if a device 500 that generates a spurious magnetic field is present in the proximity of the electric plug 200, the first reed switch 233 is closed under the action of the magnetic field generated by the identification means of the socket outlet, but the second reed switch 283 is opened under the effect of the spurious magnetic field. Thus, no electric current flows through the secondary electrical circuit 290.

Thus, current flows through the secondary electrical circuit 290 only when the magnet 133 of the socket outlet 100 is the sole magnetic field source in the proximity of the electric plug 200. This guarantees that the pilot signal constituted by the passage of current is forwarded only when it is certain that the socket outlet includes identification means.

In practice, the pilot signal is a binary signal: when a pilot signal is forwarded that indicates that it is certain that the socket outlet is adapted to supply a high current of up to 16 A.

The absence of a forwarded pilot signal or a pilot signal equal to zero indicates that the socket outlet is considered to be a standard socket outlet that is not certain to be capable of delivering current equal to 16 A without being damaged.

Thus, when the electric plug of the battery of the electric vehicle forwards a pilot signal indicating that the socket outlet is adapted to deliver a current of 16 A, the battery is charged under optimized conditions and the battery of the vehicle draws a charging current of 14 A for the usual charging duration.

If the electric plug that connects the battery of the vehicle to the socket outlet forwards a pilot signal indicating that the socket outlet is not certain to be capable of delivering a current of 16 A, then the battery of the vehicle draws a current that is less than 16 A, e.g. equal to 8 A, for a duration that is longer than the usual charging duration, so as to charge the battery, without damaging the socket outlet.

The vehicle can thus optimize its charging time as a function of the socket outlet to which it is connected, without putting the installation in danger.

The invention also relates to the electrical assembly comprising the socket outlet of the invention and its complementary electric plug as described above.

The pilot signal enables the electric plug to distinguish between the socket outlet 100 and another socket outlet that delivers an electrical signal of different characteristics. For example, when the identification means are installed on a socket outlet that is capable of delivering a high-amperage current, it is possible to distinguish between the socket outlet that is capable of delivering a high-amperage electrical signal and a socket outlet that is capable of delivering only a lower-amperage electric current.

The electrical appliance may consequently adjust its operation, e.g. limiting the current it draws from the socket outlet in order to operate at the maximum current that the socket outlet can deliver without being damaged.

In a variant, each of the first and second reed switches could be connected to respective independent electrical circuits that are different from the main electrical circuit of the electric plug.

In this configuration and by way of example, two reed switches are used that close in the presence of a magnetic field.

The closure of the first reed switch thus allows a first secondary electrical circuit of the plug to pass a current, thereby constituting the pilot signal of the electric plug.

The closure of the second reed switch thus allows a second secondary electrical circuit of the plug to pass a current, thereby constituting the alert signal of the electric plug.

The electrical appliance, in this embodiment the electric vehicle, receives both the pilot signal and the alert signal.

In the presence of an alert signal, the electric vehicle may, for example, be programmed so as to ignore the pilot signal it is receiving and to perform charging during which the vehicle draws a current that is less than 16 A for a duration that is longer than the usual charging duration, so as to charge the battery without damaging the socket outlet.

In the presence of a pilot signal but no alert signal, the battery is charged under optimized conditions and the battery of the vehicle draws a charging current of 14 A for the usual charging duration.

It is also possible to envisage that the verification means of the electric plug comprise more than one reed switch.

These switches are connected in series in the secondary electrical circuit as they are located at increasing distances from the front face of the electric plug. All of these switches open in the presence of a spurious magnetic field. Their sensitivity is adjusted as a function of the magnetic field issued by the magnet of the socket outlet, so that their changes in state are not triggered by the magnetic field of that magnet when the plug is inserted into the socket outlet.

These switches could also be located at the same distance from the front face of the electric plug. The fact that the verification means comprise a plurality of switches thus makes it possible to detect a spurious magnetic field over a greater volume around the electric plug. The sensitivity of the verification means is thus increased.

Since the magnetic field issued by the magnet of the socket outlet decreases on moving away from the magnet, it disappears at a certain distance from the rear wall of the well of the socket outlet. A switch located far enough away from the front face of the electric plug would be situated outside the magnetic field of the magnet of the socket outlet and could benefit from being highly sensitive in order to detect a spurious magnetic field, without any risk of being influenced by the magnetic field of the magnet of the socket outlet.

In a variant, it is possible to envisage replacing the first reed switch by a Hall-effect sensor.

The Hall-effect sensor issues an electrical signal when it is immersed in a magnetic field. The electrical signal is thus issued when the Hall-effect sensor is brought up to the magnet of the socket outlet, which inevitably occurs when the electric plug is inserted into the socket outlet. The electrical signal issued by the Hall-effect sensor is thus forwarded by the secondary electrical circuit of the electric plug to the electrical appliance.

By connecting a reed switch in series in said secondary electrical circuit that forwards the electrical signal issued by the Hall-effect sensor, it is possible, in the same way as described above, to block the forwarding of the pilot signal when a spurious magnetic field source is present in the proximity of the electric plug, which spurious source might issue a signal that is mistaken for the pilot signal. The user is thus guaranteed that the pilot signal is forwarded only when in the presence of a socket outlet that does indeed include identification means.

It is also possible to envisage using a first Hall-effect sensor for the reader means of the electric plug, and a second Hall-effect sensor for the verification means of the plug.

In this configuration, each Hall-effect sensor is preferably connected in a distinct secondary circuit.

The electrical signal issued by the first Hall-effect sensor constitutes the pilot signal forwarded by the electric plug, while the electrical signal issued by the second Hall-effect sensor constitutes the alert signal forwarded by the electric plug.

Both signals may be forwarded to the electrical appliance connected to the electric plug and processed by said electrical appliance so as to determine whether the socket outlet does indeed include identification means, or whether the pilot signal is generated by a spurious magnetic field.

The invention claimed is:

1. An electric plug that is adapted to be plugged into a socket outlet delivering an electrical signal and including identification means that are adapted to communicate or to co-operate with the electric plug so as to generate a pilot signal, said electric plug including:
    reader means that are adapted to receive the pilot signal issued by said identification means, and to forward said pilot signal to the electric plug when a first sensor of the reader means detects a first magnetic field; and
    verification means that are adapted to block forwarding of the pilot signal when a second magnetic field is detected by a second sensor of the verification means,
    wherein said first sensor is a reed switch with contacts that make contact by a presence of the first magnetic field, and said second sensor is a reed switch with contacts that break contact by a presence of the second magnetic field.

2. The electric plug according to claim 1, wherein the reed switches of the first and second sensors are connected in series in a common secondary electrical circuit of the electric plug.

3. The electric plug according to claim 1, wherein the reed switch of the reader means is connected to a secondary electrical circuit and the reed switch of the verification means is connected to a tertiary electrical circuit of the plug, distinct from the secondary electrical circuit.

4. The electric plug according to claim 1, wherein the reader means and the verification means are carried by a single support.

5. The electric plug according to claim 1, wherein the reed switch of the reader means is situated closer to a front face of the plug carrying connection pins of the plug than the reed switch of the verification means.

6. The electric plug according to claim 5, wherein the reed switches of the first and second sensors are connected in series in a common secondary electrical circuit of the electric plug.

7. The electric plug according to claim 5, wherein the reed switch of the reader means is connected to a secondary electrical circuit and the reed switch of the verification means is connected to a tertiary electrical circuit of the plug, distinct from the secondary electrical circuit.

8. An electrical assembly comprising:
    a socket outlet; and
    an electric plug that is adapted to be plugged into said socket outlet,
    the socket outlet delivering an electrical signal and including identification means that are adapted to communicate or to co-operate with reader means of the electric plug so as to generate a pilot signal that is representative of the electrical signal delivered by the socket outlet, and
    the electric plug further comprising verification means that are adapted to detect a magnetic field not issued by the identification means, and to block forwarding of the pilot signal when the magnetic field not issued by the identification means is detected, wherein,
    said identification means of the socket outlet comprise a magnet,
    said reader means of the electric plug comprise a secondary electrical circuit comprising a first reed switch that is sensitive to magnetic fields and that is adapted to change state when the electric plug is inserted into the socket outlet, and
    said verification means comprise a second reed switch that is connected in series with said first reed switch and that is adapted to change state when the electric plug approaches a spurious magnetic field not issued by the socket outlet.

9. An electrical assembly comprising:
    a socket outlet; and
    an electric plug that is adapted to be plugged into said socket outlet,
    the socket outlet delivering an electrical signal and including identification means that are adapted to communicate or to co-operate with reader means of the electric plug so as to generate a pilot signal, and
    the electric plug further comprising verification means that are adapted to detect a magnetic field not issued by the identification means, and to forward an alert signal when the magnetic field not issued by the identification means is detected, wherein,
    said identification means of the socket outlet comprise a magnet,
    said reader means of the electric plug comprise a secondary electrical circuit comprising a first reed switch that is sensitive to magnetic fields and that is adapted to change state when the electric plug is inserted into the socket outlet, and
    said verification means comprise a tertiary electrical circuit comprising a second reed switch that is adapted to change state when the electric plug approaches a spurious magnetic field not issued by the socket outlet.

10. An electrical assembly comprising:
    a socket outlet; and
    an electric plug that is adapted to be plugged into said socket outlet,
    the socket outlet delivering an electrical signal and including identification means that are adapted to communicate or to co-operate with reader means of the electric plug so as to generate a pilot signal that is representative of the electrical signal delivered by the socket outlet, and
    the electric plug further comprising verification means that are adapted to detect a magnetic field not issued by the identification means, and to block forwarding of the pilot signal when the magnetic field not issued by the identification means is detected, wherein,
    said identification means of the socket outlet comprise a magnet,
    said reader means of the electric plug comprise a Hall-effect sensor that is adapted to issue said pilot signal by means of a secondary electrical circuit of the electric plug when the electric plug is inserted into said socket outlet, and
    said verification means comprise a reed switch that is arranged on the secondary circuit, in series with said Hall-effect sensor, and that is adapted to change state when the electric plug approaches a spurious magnetic field not issued by the socket outlet.

11. An electrical assembly comprising:
    a socket outlet; and
    an electric plug that is adapted to be plugged into said socket outlet,
    the socket outlet delivering an electrical signal and including identification means that are adapted to communicate or to co-operate with reader means of the electric plug so as to generate a pilot signal, and the electric plug further comprising verification means that are adapted to detect a magnetic field not issued by the identification means, and to forward an alert signal when the magnetic field not issued by the identification means is detected, wherein, said identification means of the socket outlet comprise a magnet, said reader means of the electric plug comprise a first Hall-effect sensor that is adapted to issue said electrical pilot signal by means of a secondary electrical circuit of the electric plug when the electric plug is inserted into said socket outlet, and said verification means comprise a second Hall-effect sensor that is adapted to issue said electrical alert signal by means of a tertiary electrical circuit of the electric plug when the electric plug is approached by a spurious magnetic field not issued by the socket outlet.

12. An electric plug that is adapted to be plugged into a socket outlet delivering an electrical signal and including identification means that are adapted to communicate or to co-operate with the electric plug so as to generate a pilot signal, said electric plug including:

reader means that are adapted to receive the pilot signal issued by said identification means, and to supply said pilot signal to a circuit of the electric plug when a first sensor of the reader means detects a first magnetic field; and verification means that are adapted to forward an alert signal when a second magnetic field of the verification means is detected by a second sensor, wherein said first sensor is a reed switch with contacts that make contact by a presence of the first magnetic field, and said second sensor is a reed switch with contacts that break contact by a presence of the second magnetic field.

13. The electric plug according to claim 12, the reed switch of the reader means is situated closer to a front face of the plug carrying connection pins of the plug than the reed switch of the verification means.

14. The electric plug according to claim 12, wherein the reader means and the verification means are carried by a single support.

* * * * *